United States Patent
Giridharan et al.

(10) Patent No.: US 12,297,774 B2
(45) Date of Patent: May 13, 2025

(54) FUEL MIXER

(71) Applicant: General Electric Company, Schenectady, NY (US)

(72) Inventors: Manampathy G. Giridharan, Mason, OH (US); Pradeep Naik, Karnataka (IN); Narendra D. Joshi, Schenectady, NY (US); Harris D. Abramson, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 5 days.

(21) Appl. No.: 17/244,729

(22) Filed: Apr. 29, 2021

(65) Prior Publication Data

US 2022/0349342 A1 Nov. 3, 2022

(51) Int. Cl.
- *F02C 7/14* (2006.01)
- *F02C 3/22* (2006.01)
- *F23R 3/28* (2006.01)

(52) U.S. Cl.
CPC ............... *F02C 7/14* (2013.01); *F02C 3/22* (2013.01); *F23R 3/286* (2013.01); *F05D 2220/32* (2013.01); *F05D 2240/35* (2013.01)

(58) Field of Classification Search
CPC .. F23R 3/286; F02C 7/222; F02C 7/22; F02C 7/14; F02C 3/22
See application file for complete search history.

(56) References Cited

U.S. PATENT DOCUMENTS

| | | | |
|---|---|---|---|
| 4,951,463 A | | 8/1990 | Lee et al. |
| 5,528,903 A | * | 6/1996 | Schreckling ............... F23R 3/50 |
| | | | 60/736 |
| 5,613,363 A | * | 3/1997 | Joshi ....................... F23R 3/286 |
| | | | 60/737 |
| 5,791,137 A | | 8/1998 | Evans et al. |
| 8,147,121 B2 | | 4/2012 | Lacy et al. |
| 8,276,385 B2 | | 10/2012 | Zuo et al. |
| 8,312,722 B2 | | 11/2012 | York et al. |

(Continued)

FOREIGN PATENT DOCUMENTS

| | | |
|---|---|---|
| CN | 104969003 A | 10/2015 |
| CN | 107676817 A | 2/2018 |

(Continued)

*Primary Examiner* — Gerald L Sung
*Assistant Examiner* — Jacek Lisowski
(74) *Attorney, Agent, or Firm* — Venable LLP; Griffin A. A. Deadwick; Michele V. Frank

(57) ABSTRACT

A fuel mixer configured to provide a fuel-air mixture to a combustor of an engine. The fuel mixer may include a mixer body having a mixer outer wall, a center body, an annular passageway defined between the mixer outer wall and the center body, and a fuel tube assembly placed circumferentially about the mixer body. The fuel tube assembly may include at least one fuel channel for injecting a fuel flow into the annular passageway. The fuel tube assembly may be configured to cool a boundary layer flow present in the annular passageway. The fuel tube assembly may be configured to cool the mixer outer wall, the center body, or both the mixer outer wall and the center body. Heat from the mixer outer wall, the center body, or both the mixer outer wall and the center body, may pass to the fuel flow in the fuel tube assembly.

11 Claims, 9 Drawing Sheets

(56) References Cited

U.S. PATENT DOCUMENTS

| | | |
|---|---|---|
| 8,322,143 B2 | 12/2012 | Uhm et al. |
| 8,424,311 B2 | 4/2013 | York et al. |
| 8,539,773 B2 | 9/2013 | Ziminsky et al. |
| 8,910,483 B2 | 12/2014 | Von Der Bank |
| 8,959,921 B2 | 2/2015 | Khan et al. |
| 9,134,023 B2 | 9/2015 | Boardman et al. |
| 9,528,705 B2 | 12/2016 | Melton |
| 10,232,440 B2 | 3/2019 | Melton |
| 10,295,190 B2 | 5/2019 | Boardman et al. |
| 10,352,569 B2 | 7/2019 | Boardman et al. |
| 10,364,751 B2 * | 7/2019 | Ryon .................. F23R 3/346 |
| 10,502,425 B2 | 12/2019 | Boardman et al. |
| 2004/0250547 A1 | 12/2004 | Mancini et al. |
| 2009/0293482 A1 | 12/2009 | Davis, Jr. et al. |
| 2011/0000214 A1 | 1/2011 | Helmick et al. |
| 2013/0283809 A1 * | 10/2013 | Twardochleb ............ F23R 3/36 |
| | | 60/39.463 |
| 2015/0285502 A1 | 10/2015 | DiCintio et al. |
| 2017/0003031 A1 * | 1/2017 | Boardman .............. F23D 11/12 |
| 2017/0051675 A1 * | 2/2017 | McMasters ............. C23C 28/32 |
| 2017/0248318 A1 | 8/2017 | Kulkarni |
| 2017/0268784 A1 * | 9/2017 | Crawley ................. F23R 3/34 |
| 2018/0080384 A1 | 3/2018 | Prociw et al. |
| 2018/0363912 A1 * | 12/2018 | Graham ................ F23D 17/002 |

FOREIGN PATENT DOCUMENTS

| | | |
|---|---|---|
| CN | 110177976 A | 8/2019 |
| CN | 111473362 A | 7/2020 |

\* cited by examiner

FUEL MIXER

TECHNICAL FIELD

The present disclosure relates to a fuel mixer. More particularly, the present disclosure relates to a mixer including a fuel tube assembly.

BACKGROUND

Current mixers for natural gas-powered turbine engines blend fuel with air to create a fuel-air mixture for providing the fuel-air mixture to a combustor of the engine. The conventional mixers mix inlet air and inlet fuel to create the fuel-air mixture. The inlet air may be introduced to the combustor without imparting a swirl. Current mixers may include a fuel inlet and an air inlet that mix within an annular passage in the mixer.

BRIEF SUMMARY

According to an embodiment, a fuel mixer configured to provide a fuel-air mixture to a combustor of an engine may include a mixer body having a mixer outer wall; center body; an annular passageway defined between the mixer outer wall and the center body; and a fuel tube assembly placed circumferentially about the mixer body, the fuel tube assembly comprising at least one fuel channel for injecting a fuel flow into the annular passageway. The fuel tube assembly may be configured to cool a boundary layer flow present in the annular passageway. The fuel tube assembly may be configured to cool the mixer outer wall, the center body, or both the mixer outer wall and the center body. The heat from the mixer outer wall, the center body, or both the mixer outer wall and the center body, may pass to the fuel flow in the fuel tube assembly.

According to an embodiment, a method of cooling a fuel mixer in a combustor may include injecting an air flow into an annular passageway of the fuel mixer; injecting a fuel flow into the annular passageway downstream of the air flow; mixing the fuel flow and the air flow in the annular passage to provide a fuel-air flow; cooling the fuel-air flow with the fuel flow; cooling a mixer outer wall of the fuel mixer with the fuel flow; and cooling a center body of the fuel mixer with the fuel flow. The fuel flow may be provided within the outer mixer wall.

Additional features, advantages, and embodiments of the present disclosure are set forth or apparent from a consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

The fuel tube assemblies of the present disclosure may be provided in mixers of a combustor of an engine, such as, for example, a gas turbine engine. The fuel tube assemblies of the present disclosure may assist in reducing the flashback/flame-holding risk with burning hydrogen or hydrogen blended fuels at nominal flow velocities in the conventional mixing tubes. Due to high burning velocities of hydrogen fuels, flames may propagate through the boundary layer into the mixing tube and stabilize causing premixer hardware damage. The fuel tube assemblies of the present disclosure provide cooling channels that may prevent or reduce flame-holding within the mixing tube by cooling the boundary layer with fuel (prior to injection of the fuel). The fuel may be at a lower temperature than the compressor discharge air temperature (e.g., the temperature of the air entering the mixer). Boundary layer cooling may be achieved by additively-made (built-in) fuel channels in a serpentine or spiral fashion before the fuel is injected into the air stream through fuel outlet orifices. The positioning of the fuel orifices relative to mixing tube exit is optimized for pre-flame mixing of fuel and air, as well as for sufficiently cooling the boundary layer to prevent flame-holding risk. The fuel tube assemblies of the present disclosure may allow for burning of hydrogen fuels.

The present disclosure describes a mixer having a fuel tube assembly provided around the body of the mixer. The fuel tube assembly may include one or more curved or serpentine channels. The fuel tube assembly may provide fuel to the mixer and may also operate to cool the outer mixer wall before the fuel is injected into the mixer passage. The fuel tube assembly may extend longitudinally and circumferentially around the mixer body. In some embodiments, the fuel tube assembly may be helically placed around the mixer. In some embodiments, the fuel tube assembly may include one or more fuel tube subassemblies. In some embodiments, a fuel tube assembly may be placed around the bluff body within the mixer.

Figure 1:
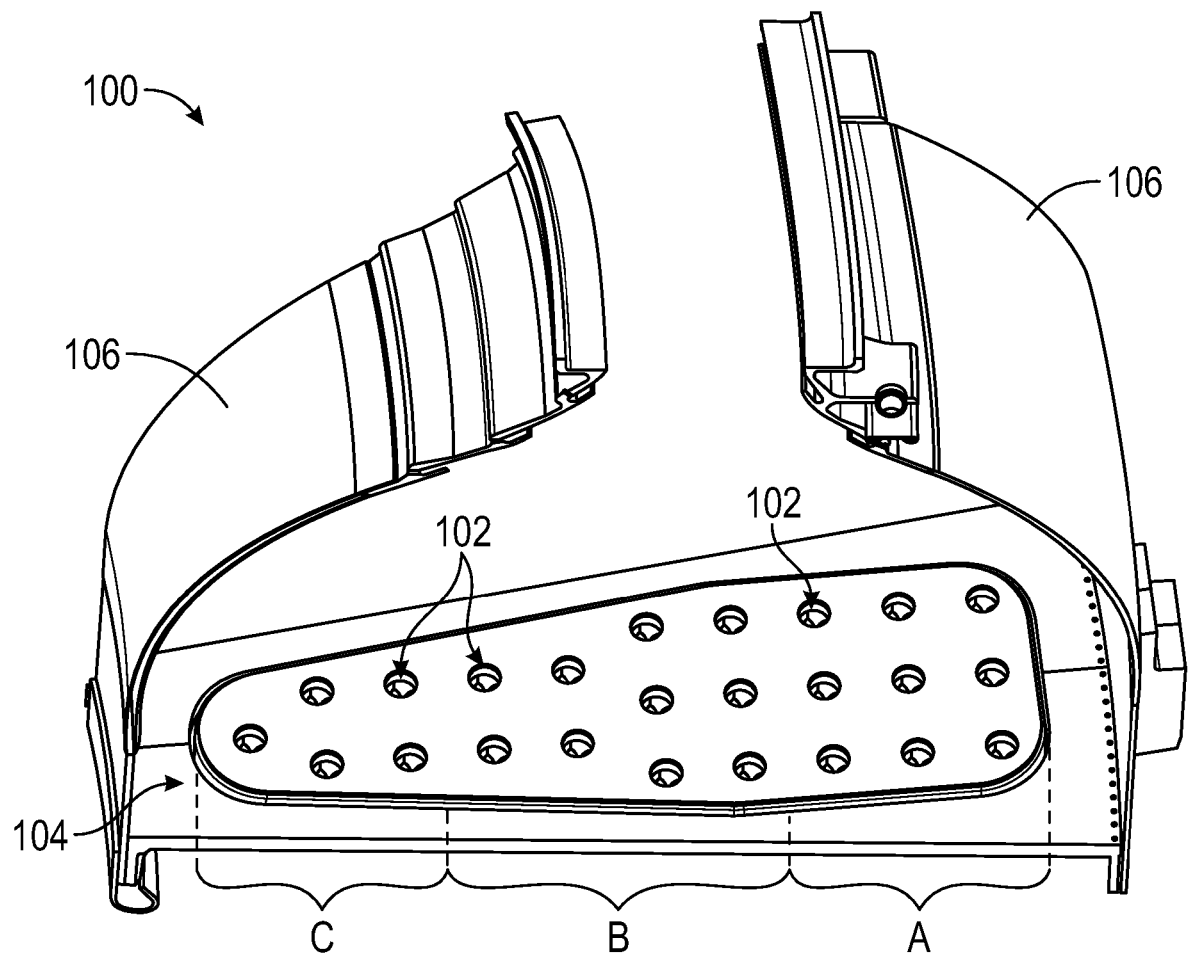
FIG. 1 shows a schematic, perspective view of a mixer array with a combustion liner, according to an embodiment of the present disclosure.

Referring to FIG. 1, a schematic, perspective view of a mixer array 100 is shown. The mixer array 100 may include one or more mixers 102. The mixer array 100 may be divided into one or more zones. For example, in FIG. 2, the mixer array 100 may be divided into multiple zones: zone A, zone B, and zone C, etc. The one or more mixers 102 provided in the zones A, B, and C may all be of the same construction, may all be of different construction, or may include some mixers of the same construction and some mixers of different construction. The mixer array 100, and, thus, the one or more mixers 102, may be located on a support 104 coupled to a combustion liner 106.

Figure 2:
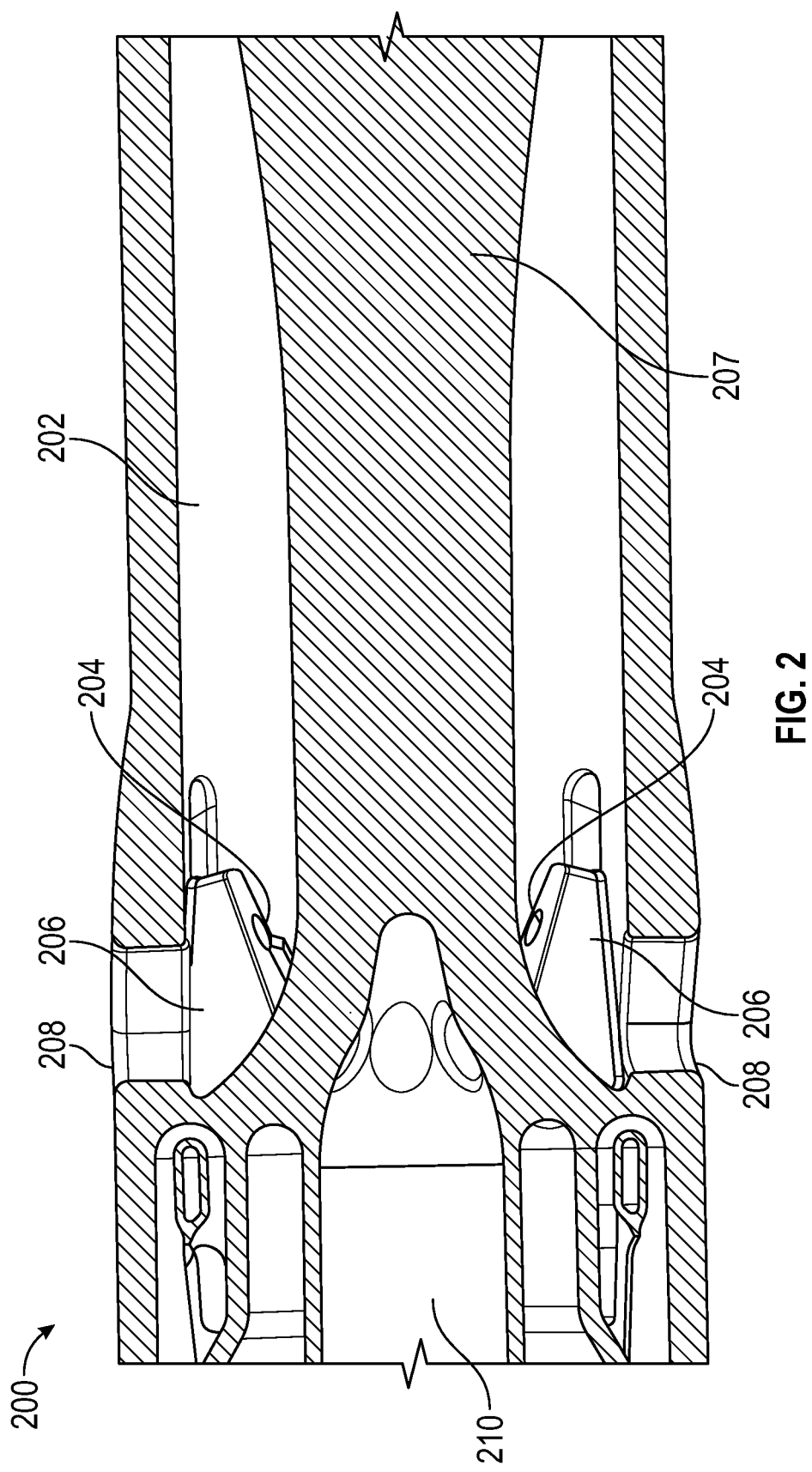
FIG. 2 shows a schematic, partial sectional view of a mixer, taken through a centerline of the mixer, according to an embodiment of the present disclosure.

Referring to FIG. 2, a sectional view of a mixer 200 is shown. The mixer 200 may be provided in the mixer array 100 of FIG. 1 (e.g., the mixer 200 may take the place of one or more mixers 102 in the mixer array 100 of FIG. 1). The mixer 200 may be included in an engine, such as, for example, in a DLE engine. The mixer 200 may include an annular mixer passage 202, one or more openings 208 and a central passage 210. The fuel may be injected from one or more openings 204 on the frustrum 206. The mixer 200 may further include a bluff body 207, also referred to herein as a center body. The bluff body 207 may create the annular mixing passage 202 as shown. Air that flows out from the bluff body 207 may be axially flow fed through the central passage 210. The fuel may be injected at a forward side of the mixer 200. The mixer 200 may allow for a fuel blend lower percentage blends of Hydrogen fuel ($H_2$ fuel).

Figure 3:
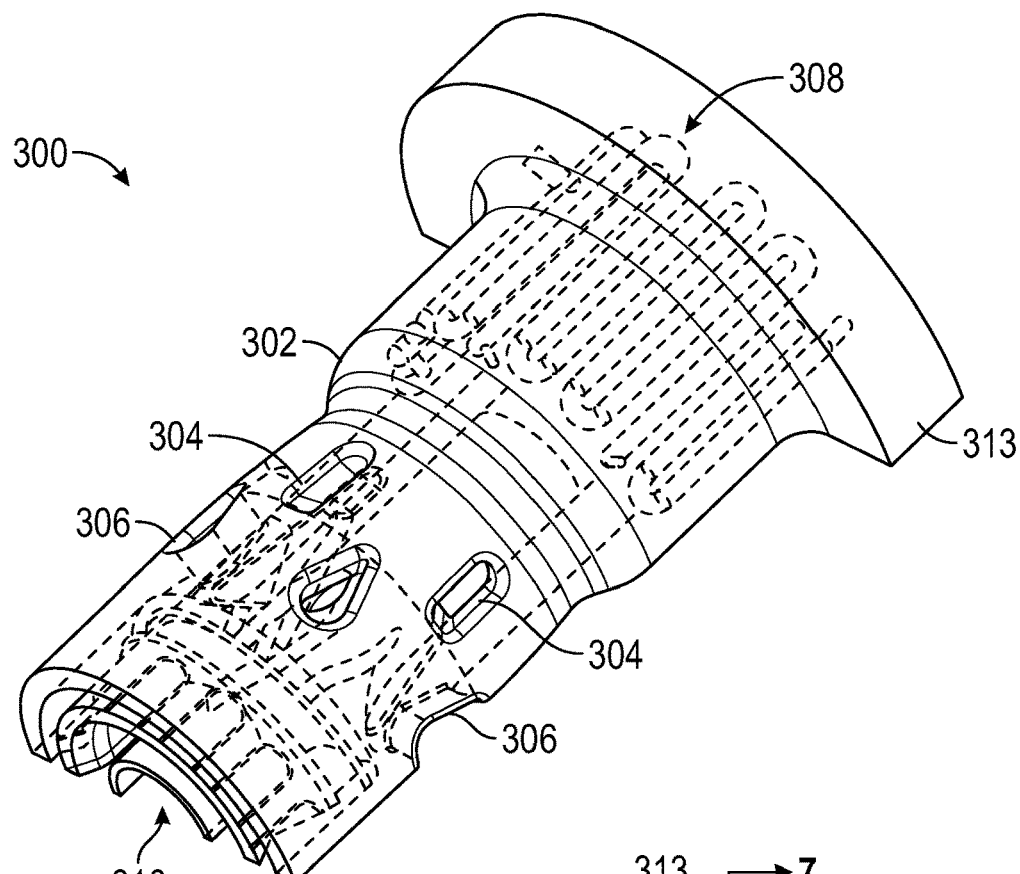
FIG. 3 shows a schematic, partial perspective view of a mixer, according to an embodiment of the present disclosure.
Figure 4:
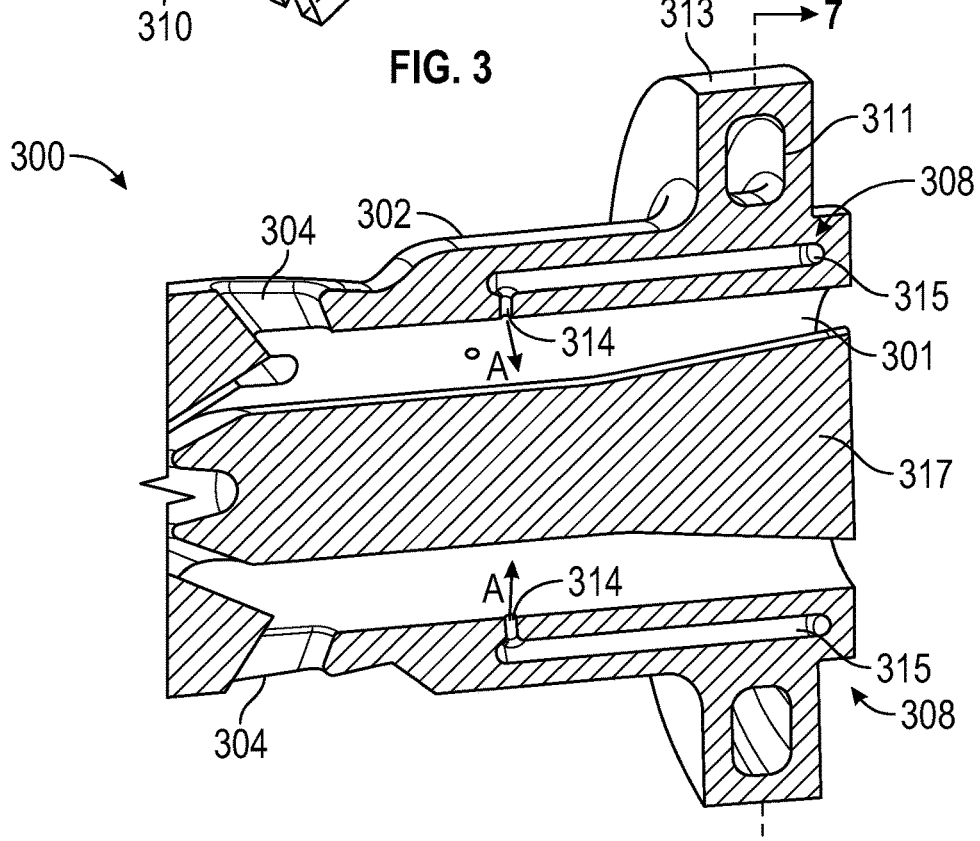
FIG. 4 shows a schematic, partial sectional view of the mixer of FIG. 3, taken through a centerline of the mixer, according to an embodiment of the present disclosure.

In FIGS. 3 and 4, an exemplary mixer 300 may have a fuel tube assembly 308. The mixer 300 may be provided in the mixer array 100 of FIG. 1 (e.g., the mixer 300 may take the place of one or more mixers 102 in the mixer array 100 of FIG. 1). The mixer 300 may be the mixer 200 or may be any known mixer, with the addition of a fuel tube assembly, such as, for example, the fuel tube assembly 308. The mixer 300 may include a central passage 310, a first plurality of openings 306, and a second plurality of openings 304. The mixer 300 may include an annular passageway 301, a mixer body 302, and a center body or bluff body 317.

An air flow may be introduced through the first plurality of openings 306 and the second plurality of openings 304 to mix with a fuel flow A (FIG. 4). The fuel flow may be a Hydrogen ($H_2$) fuel flow. The fuel flow may be introduced through the fuel tube assembly 308. As shown in FIG. 6, the fuel tube assembly 308 may include one or more fuel tube subassemblies, such as, fuel tube subassembly 308a, fuel tube subassembly 308b, and fuel tube subassembly 308c. Referring back to FIG. 3, the fuel tube subassemblies may be placed circumferentially around the mixer body 302 of the mixer 300 and longitudinally along the mixer body 302, such as shown in FIGS. 3 and 6. The arrangement of subassemblies may define the fuel tube assembly 308. The fuel tube assembly 308 may include subassemblies that are uniformly spaced, randomly spaced, or spaced with a predetermined pattern around the circumference of the mixer body 302. As shown in FIGS. 3 to 8, the fuel tube subassemblies may be fuel tubes that run axially along the mixer 300 wall. The fuel tubes may provide $H_2$ fuel to the mixer.

Figure 6:
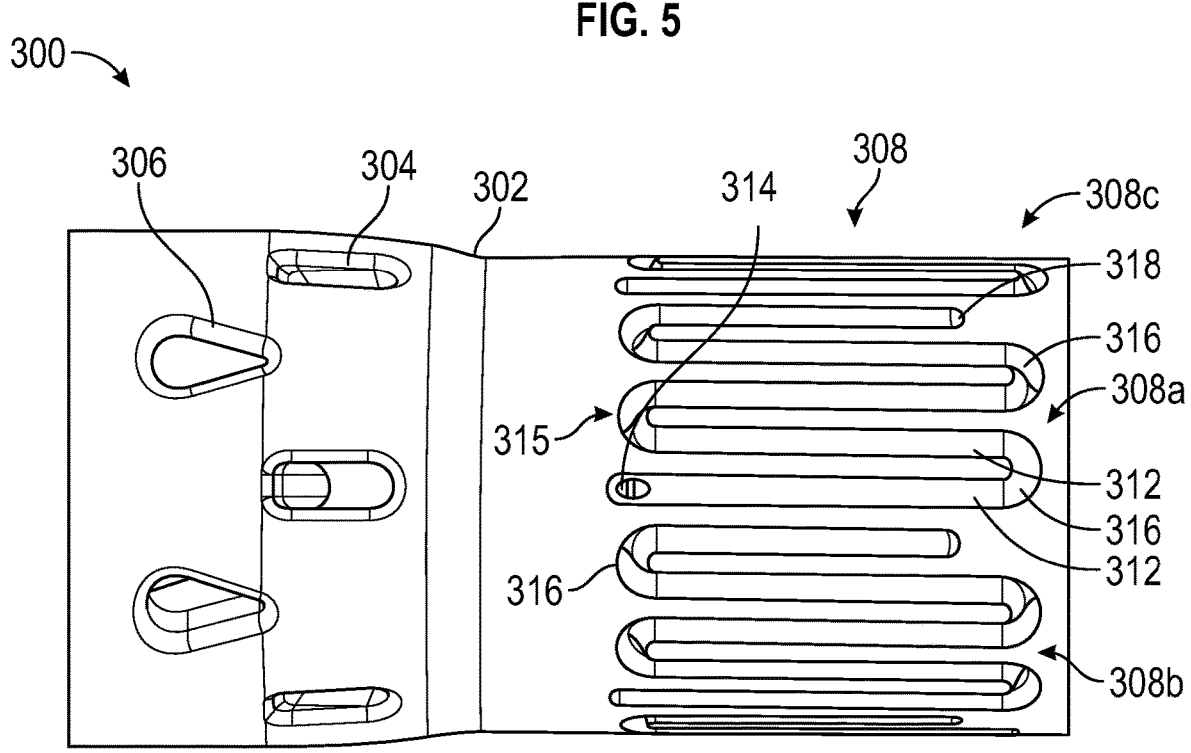
FIG. 6 shows a schematic view of the mixer of FIG. 3, according to an embodiment of the present disclosure.
Figure 7:
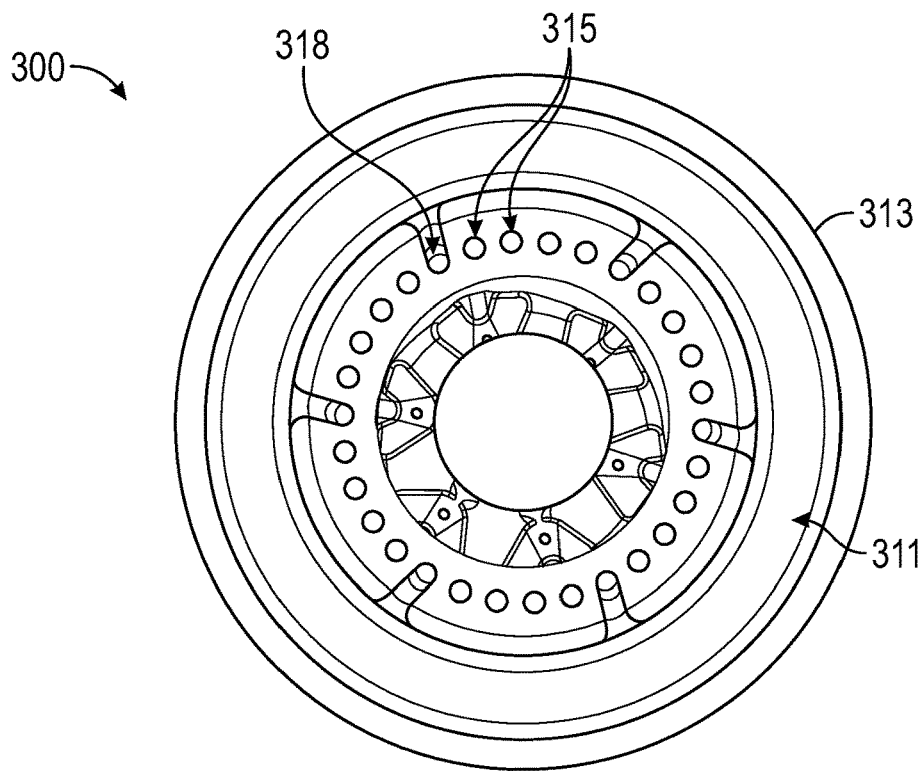
FIG. 7 shows a schematic, sectional view taken along the section line 7-7 in FIG. 4, according to an embodiment of the present disclosure.
Figure 8:
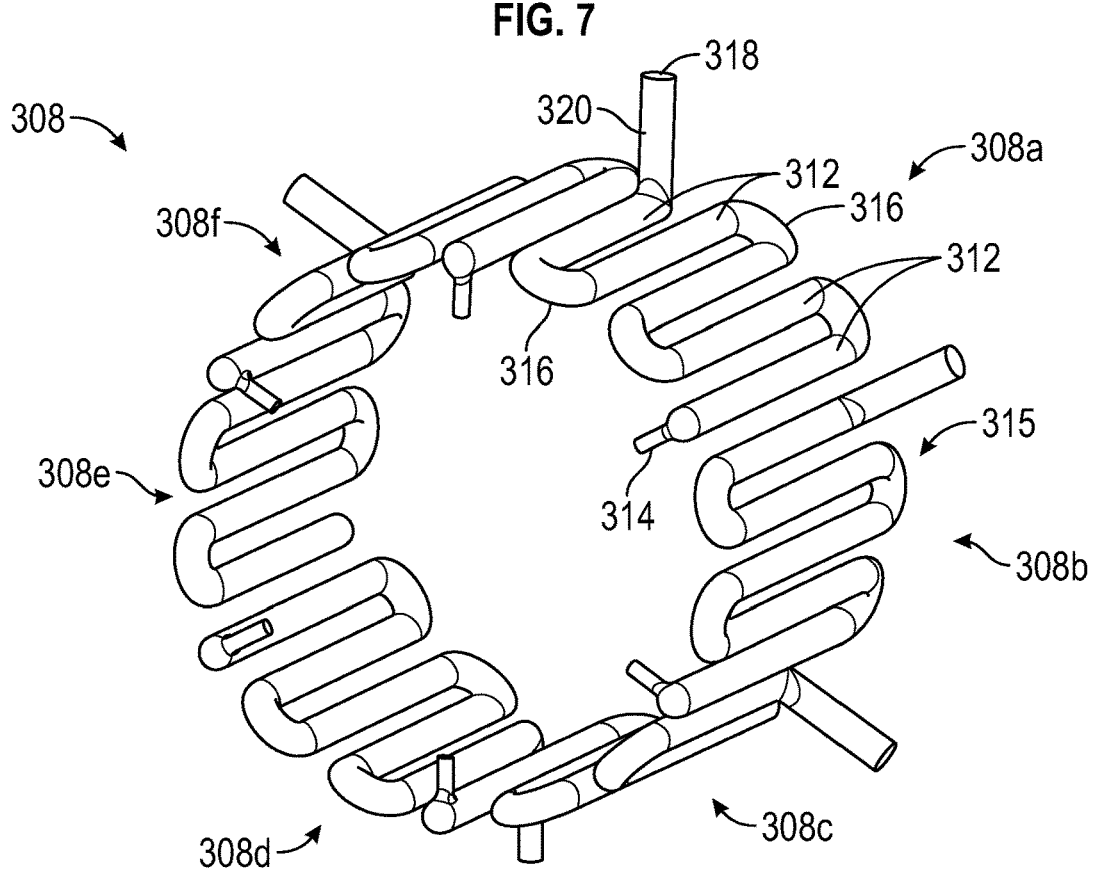
FIG. 8 shows a schematic, perspective view of the fuel tube assembly of the mixer of FIG. 3, according to an embodiment of the present disclosure.

FIGS. 4 to 8 show the mixer 300 having the fuel tube assembly 308. As mentioned, the fuel tube assembly 308 may include one or more fuel tube subassemblies, such as, for example, fuel tube subassembly 308a, fuel tube subassembly 308b, and fuel tube subassembly 308c. Each fuel tube subassembly of the fuel tube assembly 308 may define a flow passage therein. As shown in FIG. 8, for example, the fuel tube subassemblies may include a fuel inlet 318 and a fuel outlet 314. Between the fuel inlet 318 and the fuel outlet 314 may extend a passageway or fuel channel 315. The fuel channel 315 may be a serpentine passageway. The fuel channel 315 may be defined by a vertical portion 320, one or more longitudinally extending portions 312, and one or more curved portions 316. In this manner, such as shown in the exemplary fuel tube assembly 308 of FIG. 8, the fuel passageway or fuel channel 315 of the fuel tube subassembly may extend from the fuel inlet 318, down the vertical portion 320 to a longitudinally extending portion 312. The longitudinally extending portion 312 may curve or bend at the curved portion 316 to a second longitudinally extending portion 312. The curved portion 316 may be substantially semi-circular in plan view. Any number of bends or curved portions and longitudinally extended portions may be present between the fuel inlet 318 and the fuel outlet 314 of the subassembly. The number of channels making up the fuel channel 315 (also referred to as a serpentine passageway) may be determined based on the desired fuel flow, the desired engine operation, the desired cooling of the annular passageway 301, or any combination thereof.

Figure 5:
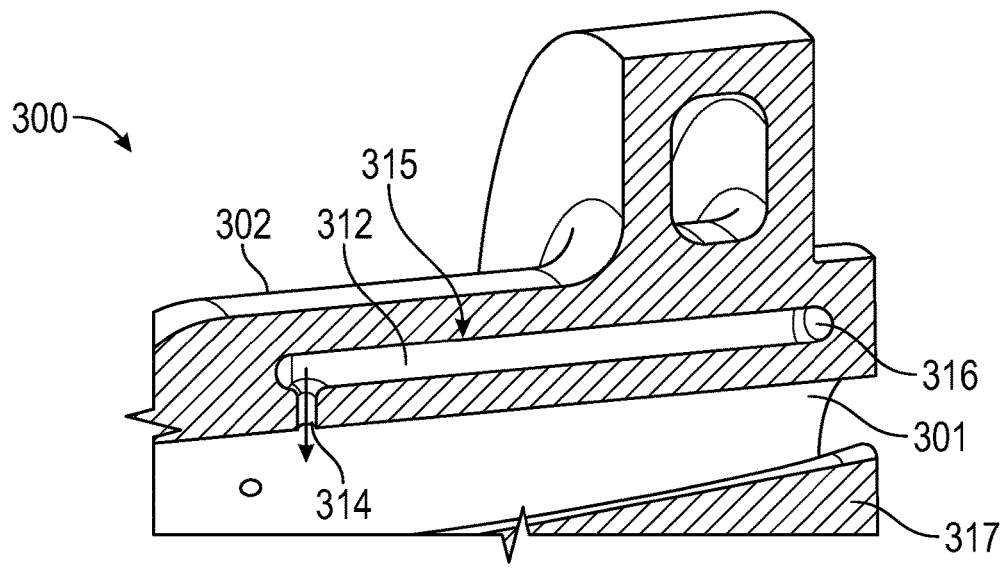
FIG. 5 shows a schematic, partial sectional view of the mixer of FIG. 3, taken through a centerline of the mixer, according to an embodiment of the present disclosure.

With reference to FIGS. 4 and 5, each fuel outlet 314 of a subassembly of the fuel tube assembly 308 may exit into the annular passageway 301 for mixing with the air flow provided through the second plurality of openings 304 and the first plurality of openings 306. The annular passageway 301 may be formed around the bluff body 317. The fuel flow A may travel from each fuel inlet 318 (FIG. 8) through the fuel channel 315 of the respective subassembly and out each fuel outlet 314 into the annular passageway 301.

Figure 9:
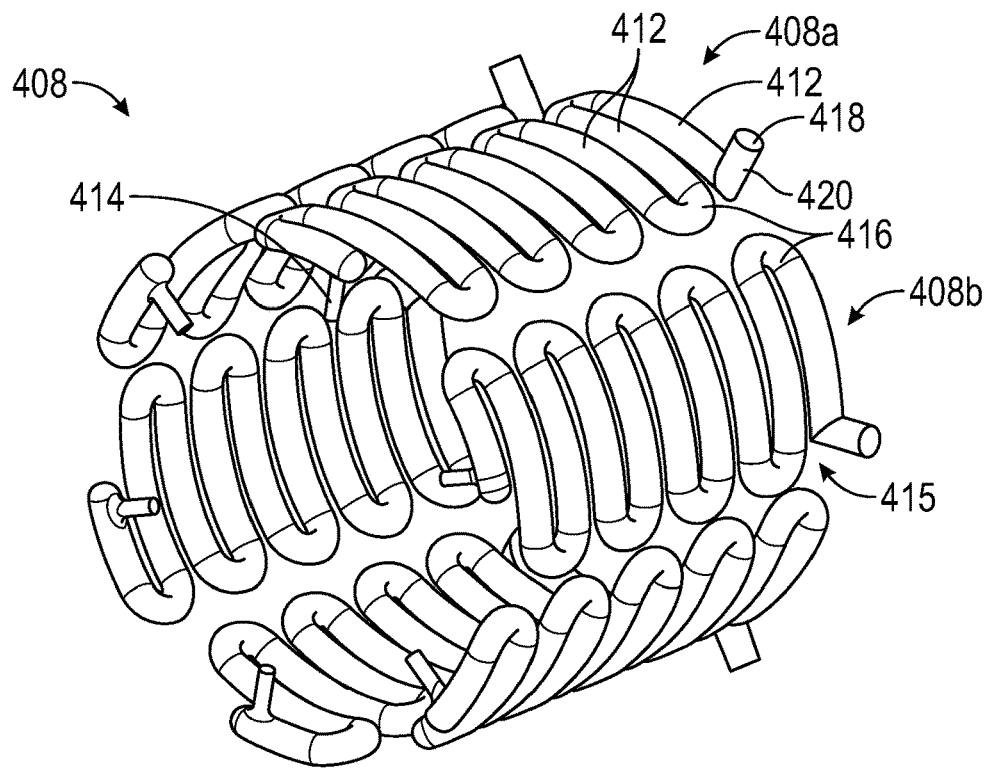
FIG. 9 shows a schematic, perspective view of a fuel tube assembly, according to an embodiment of the present disclosure.

As mentioned, and with reference to FIG. 6, the subassemblies of the fuel tube assembly 308 may be placed circumferentially around the mixer body 302 of the mixer 300. The fuel tube assembly 308 may further extend a longitudinal distance (e.g., along the length of the mixer body 302). The longitudinal distance may be defined by the longitudinal distance between opposing ends of the serpentine channel. For example, the longitudinal distance may be defined by opposing curved portions 316. Although six subassemblies (e.g., fuel tube subassemblies 308a, 308b, 308c, 308d, 308e, and 308f) are shown in FIG. 8, more or fewer may be provided. The number of subassemblies, the length along the mixer body 302, the number of turns of the serpentine channel, or any combination thereof may be selected or optimized. For example, as shown in FIG. 8, one fuel tube subassembly (e.g., 308a) may include four turns. In another example, as shown in FIG. 9, one fuel tube subassembly (e.g., 408a) may include nine turns. Although shown as extending completely around the mixer body 302 (e.g., FIG. 8), the fuel tube assembly 308 may extended only partially around the mixer body 302. In an embodiment, a portion of the fuel tube subassembly may extend partially around the mixer body 302 such that the fuel outlet 314 may be at different axial location on outer wall of the mixer in relation to other fuel outlets 314 of other fuel tube subassemblies. This may result in a change in fuel distribution at the mixer exit and hence the region of heat release that may help in lowering dynamics.

The fuel tube subassemblies may be considered to be serpentine channels. These serpentine channels may operate as a heat exchanger with the mixer outer wall. That is, as relatively cold fuel (e.g., cold with respect to the mixer body and flow within the annular passage) flows through the serpentine channel from the fuel inlet 318 to the fuel outlet 314, the fuel make take in heat from the mixer body and the flow therein. This may reduce the temperature of the mixer body material. Thus, as the fuel flows within the serpentine channel, the fuel may continue to take up heat. A similar effect occurs with the fuel tube assemblies of FIGS. 9 to 16 which similarly may be considered to be serpentine channels that operate as a heat exchanger with the mixer outer wall.

With reference back to FIG. 4, fuel, such as, for example, $H_2$ fuel may be injected radially inward from an outer wall of the mixer 300. The $H_2$ fuel may be provided by a fuel manifold 311 defined by a flange 313 of the mixer 300. As shown in FIG. 7, the fuel inlets 318 connect to the fuel manifold 311.

Figure 10:
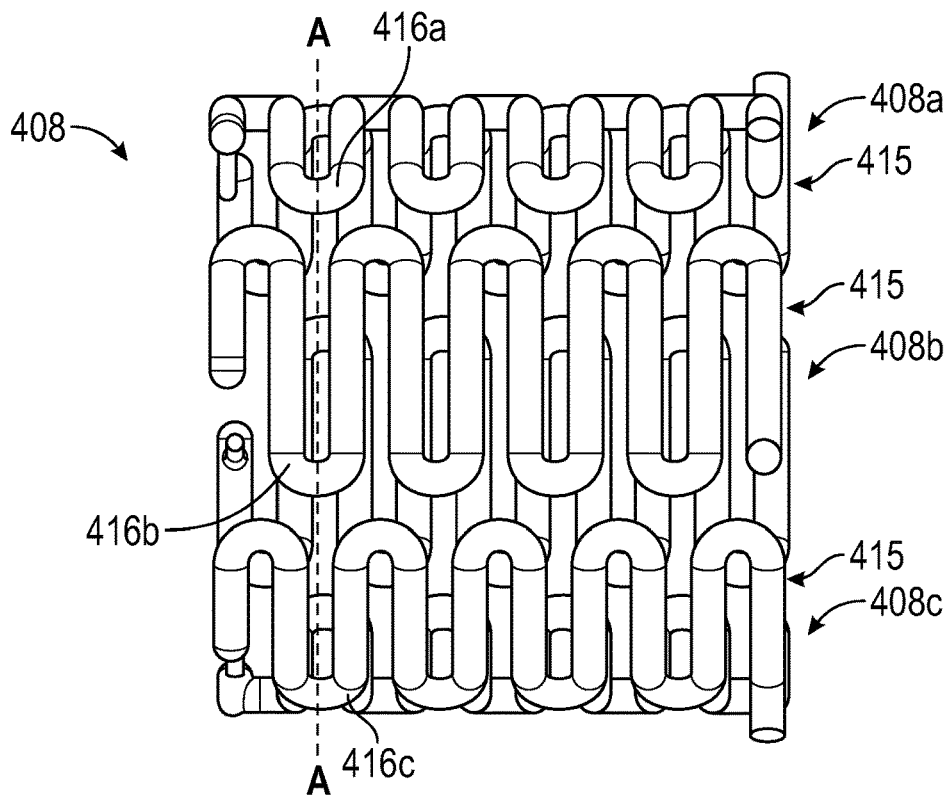
FIG. 10 shows a schematic, plan view of the fuel tube assembly of FIG. 9, according to an embodiment of the present disclosure.
Figure 11:
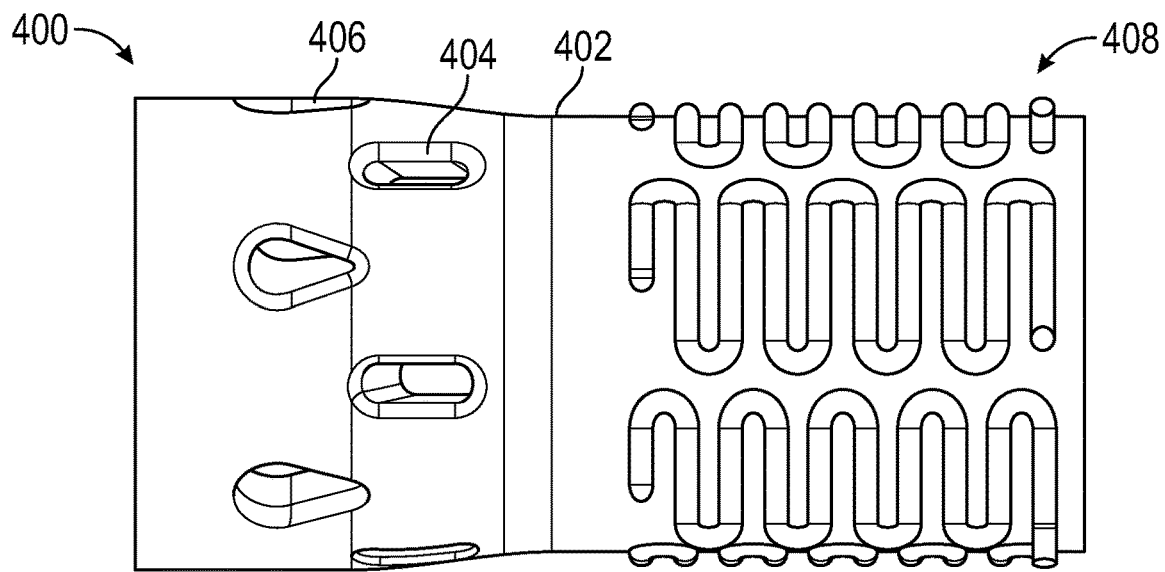
FIG. 11 shows a schematic view of a mixer including the fuel tube assembly of FIG. 9, according to an embodiment of the present disclosure.

FIGS. 9 to 11 show an exemplary fuel tube assembly 408 for a mixer 400. The mixer 400 may be provided in the mixer array 100 of FIG. 1. The mixer 400 may include a mixer body 402 and openings 404 and 406 to provide an air flow to the mixer 400. The fuel tube assembly 408 may be provided with any of the mixers described herein or with a mixer known in the art. The fuel tube assembly 408 may include a plurality of fuel tube subassemblies, such as fuel tube subassemblies 408a, 408b, and 408c. Each of the subassemblies may define a channel 415. The channel 415 may include a fuel inlet 418, a vertically extending portion 420 and a fuel outlet 414. Between the fuel inlet 418 and the fuel outlet 414, a serpentine channel defined by circumferentially extending portions 412 and curved portions 416 may be provided. The serpentine channel may be similar to the serpentine channel of the fuel tube assembly 308 of FIG. 8. However, in FIG. 8, the portions 312 may extend longitudinally along the length of the mixer body 302 such that the portions 312 form longitudinally extending portions 312 while in FIG. 9, the portions 412 may extend along the circumference of the mixer body 302 such that the portions form circumferentially extending portions 412.

As shown in FIG. 10, adjacent subassemblies (such as fuel tube subassemblies 408a, 408b, and 408c) may be circumferentially aligned such that the curved portions 416 of adjacent subassemblies are aligned. For example, a curved portion 416a of a fuel tube subassembly 408a may have a central axis A that is aligned with a curved portion 416b of fuel tube subassembly 408b and aligned with a curved portion 416c of fuel tube subassembly 408c. In another embodiment, the curved portions may be misaligned such that curved portions 416a, 416b, and 416c have axes that are offset from at least one other curved portion of an adjacent subassembly.

The fuel tubes of FIGS. 9 to 11 may provide a flow path for a fuel, such as, for example, Hydrogen ($H_2$) fuel. The $H_2$ fuel may cool the outer wall of the mixer 400 before fuel is injected into a mixer passage (not visible). The tubes may be positioned circumferentially within a section of the mixer body. The exit of the mixer 400 may see the lowest temperature as the $H_2$ fuel may pick up heat from the metal towards a forward side of the tube (e.g., near fuel inlet 418). This may occur as the fuel is injected at the fuel inlet 418 in an upstream location as compared to the fuel outlet 414.

Figure 12:
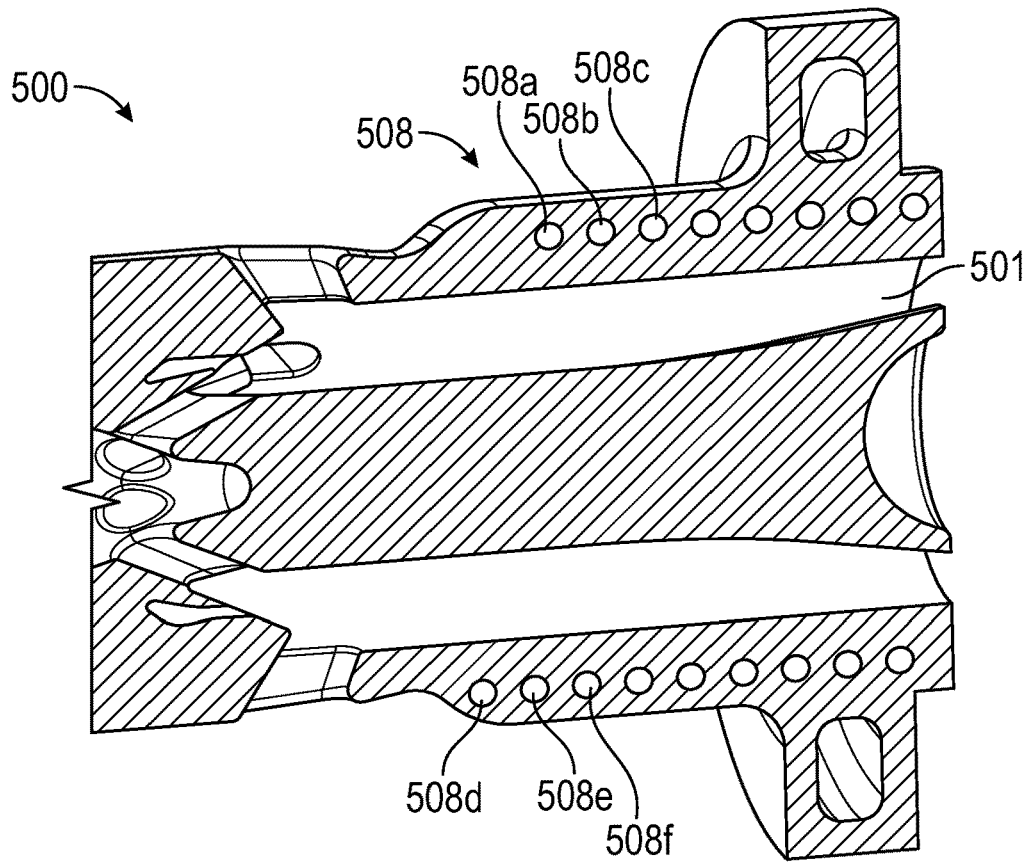
FIG. 12 shows a schematic, sectional view of a mixer, taken through a centerline of the mixer, according to an embodiment of the present disclosure.

Referring to FIG. 12, a schematic of a mixer 500 is shown having a fuel tube assembly 508. The fuel tube assembly 508 may have one or more fuel passages 508a, 508b, 508c, 508d, 508e, and 508f that exit into the annular passageway 501 of the mixer 500. As shown in FIG. 12, the fuel outlets may be axially and/or circumferentially offset from one another. For example, fuel passages 508a, 508b, and 508c may exit axially after the fuel passages 508d, 508e and 508f. Thus, the fuel outlets may be located at different axial and circumferential locations to achieve desired cooling and fuel air mixing within the mixer 500.

Figure 13:
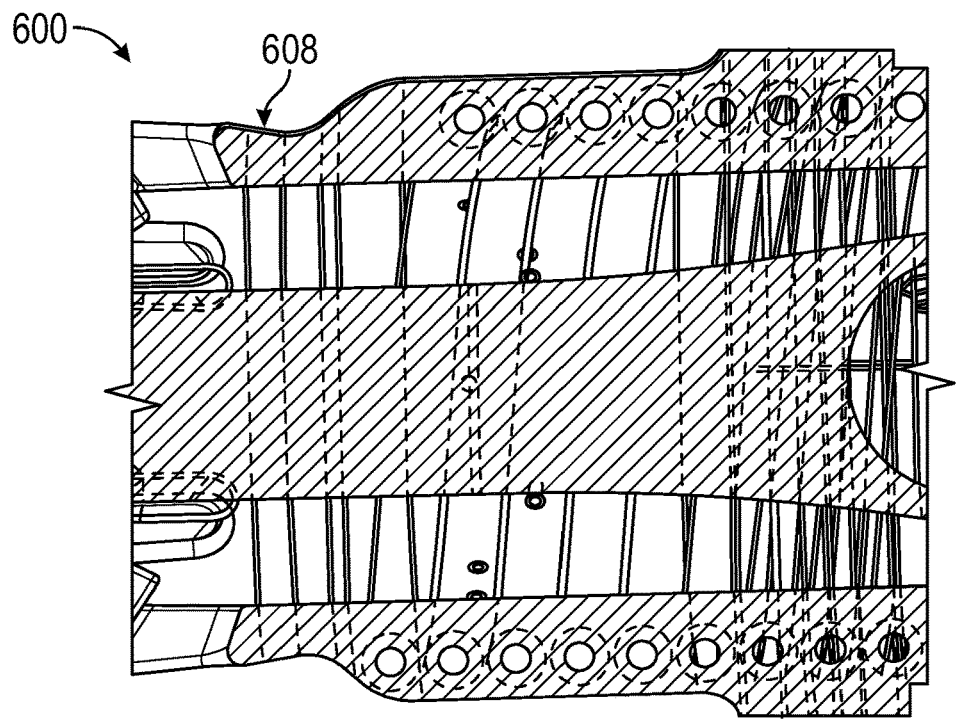
FIG. 13 shows a schematic, sectional view of a mixer, taken through a centerline of the mixer, according to an embodiment of the present disclosure.
Figure 14:
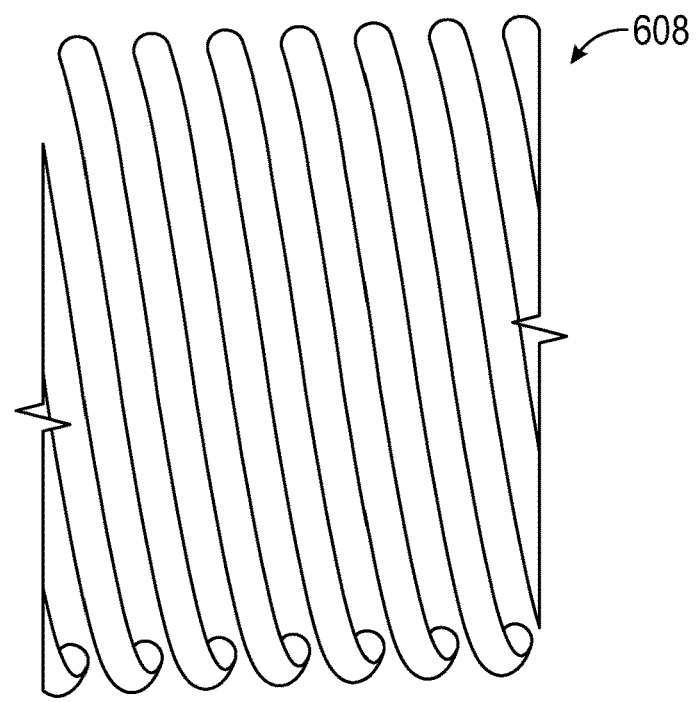
FIG. 14 shows a schematic, plan view of the fuel tube assembly of the mixer of FIG. 13, according to an embodiment of the present disclosure.

Referring to FIGS. 13 and 14, a schematic of a mixer 600 is shown having a fuel tube assembly 608. The fuel tube assembly 608 may be formed by one or more subassemblies helically formed around an outer surface of the mixer body. In FIGS. 13 and 14, multiple fuel tube assembly coils may be placed around an outer wall of the mixer to cool the outer wall.

Figure 15:
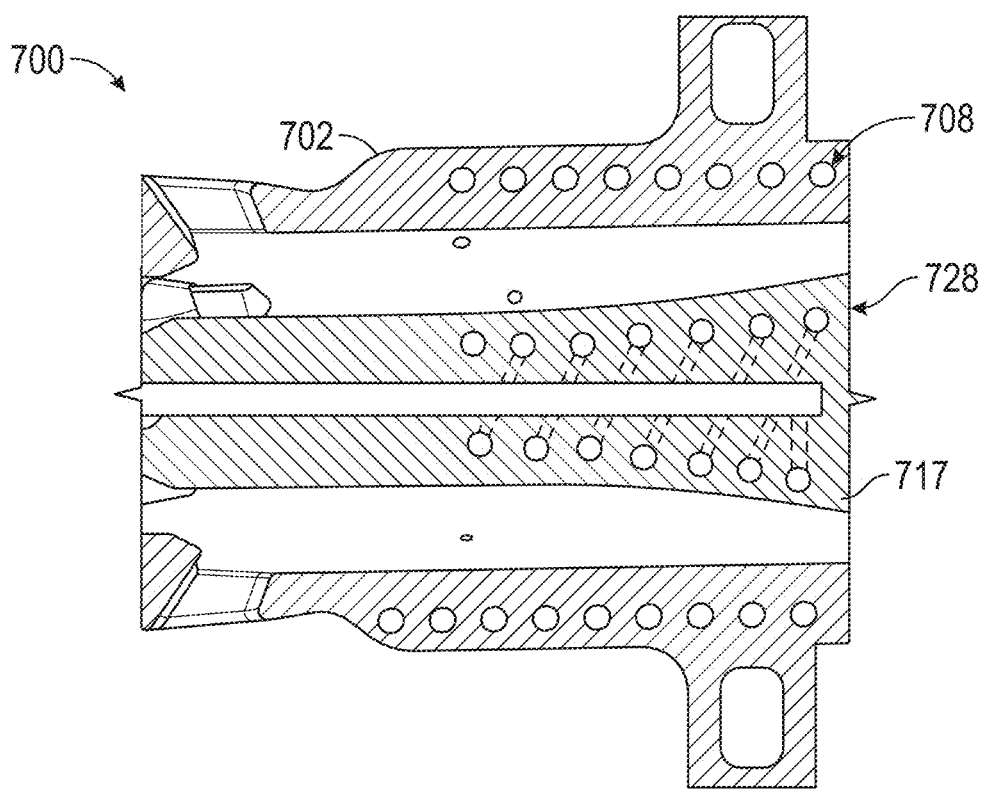
FIG. 15 shows a schematic, sectional view of a mixer, taken through a centerline of the mixer, according to an embodiment of the present disclosure.
Figure 16:
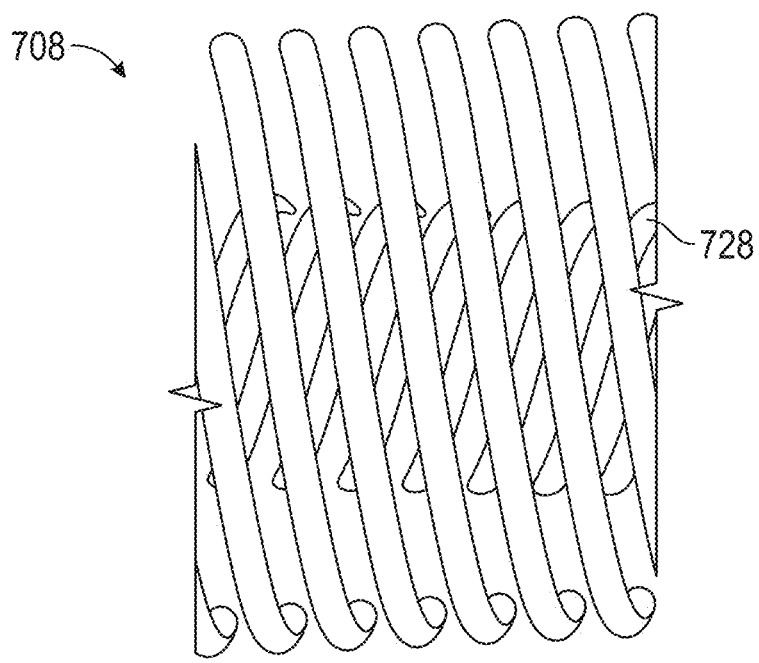
FIG. 16 shows a schematic, plan view of the fuel tube assembly of the mixer of FIG. 15, according to an embodiment of the present disclosure.

Referring to FIGS. 15 and 16, a schematic of a mixer 700 having a fuel tube assembly 708 and a fuel tube assembly 728 is shown. The fuel tube assembly 708 may be a fuel tube assembly that extends around the mixer body 702. The fuel tube assembly 708 may be any of the aforementioned fuel tube assemblies. The fuel tube assembly 728 may be a fuel tube assembly that extends around the center body or bluff body 717 of the mixer 700. The fuel tube assembly 708, the fuel tube assembly 728, or both, may be fuel tube assemblies that extend helically around the mixer 700. For example, the fuel tube assembly 708 may be include a first helically extending channel and the fuel tube assembly 728 may include a second helically extending channel. Thus, there may be coils of $H_2$ fuel on both the outer mixer wall and along the center body wall (e.g., the bluff body). The fuel flow may flow in the same direction in the fuel tube assemblies 708 and 728 (e.g., both clockwise or both counterclockwise). Alternatively, the fuel flow may be counter to one another (e.g., one flow is clockwise and the other flow is counterclockwise). In some embodiments, $H_2$ fuel may be injected from the outer wall as well as the inner wall. The split in the fuel flow (e.g., how much fuel is injected in the fuel tube assembly 728 and the fuel tube assembly 708) may vary. The split in the fuel flow may vary from 0% to 100% depending on power condition or application. The inner fuel tube assembly 728 may have 100% $H_2$ fuel and the outer fuel tube assembly 708 may have a blend of $H_2$ and natural gas, by way of example.

The fuel tube assemblies of FIGS. 12 to 15 may provide for multiple fuel coils around the outer wall of the mixer to cool the wall to prevent auto-ignition on the mixer wall and/or prevent or limit flashback. These coils of tubes may be on the center body as well as on center body surface. Each $H_2$ fuel outlet may be at different axial and circumferential position to create changes in circumferential fuel concentration at the mixer exit and, hence, a heat release rate that may, in a positive way, improve dynamics. The fuel tube assemblies may provide a cooling flow path cross section of any shape and the shape and/or size may vary along coils of the tube. For example, the tube may be bigger in aft end of mixer as compared to the front end of the mixer. $H_2$ fuel flow in the coiling tubes may be from forward to aft side or from aft to forward side. In some examples, the fuel tube assemblies may have flow towards the aft side and some towards the forward side. The fuel flow direction for the outer wall of mixer may be in the same direction as the center body or they may be in opposite direction (e.g., direction forward to aft and angular clocking, such as, for example, clockwise/counterclockwise).

The fuel tube assembly of the present disclosure may allow for fuel, such as Hydrogen ($H_2$) fuel, to be injected into the mixer body. The fuel tube assembly of the present disclosure may allow for hydrogen fuels to be used while reducing the concern for flame-holding. The fuel tube assembly may accommodate fuel blends in the range of 0% to 100% hydrogen, and any value or range therein. In some examples, the fuel tube assembly may accommodate fuel blends having 100% hydrogen content. The fuel tube assembly of the present disclosure may allow for the fuel to cool the outer wall of the mixer wall before the fuel is injected into the annular passage in the mixer. The fuel tube assembly of the present disclosure may comprise fuel tubes running axially along the mixer wall.

The fuel tube assembly of the present disclosure may include multiple fuel serpentine tubes with $H_2$ fuel connected from a fuel manifold along mixer wall. The tubes may operate to cool the wall. This may avoid auto-ignition and/or flashback inside the annular mixer passage. After the $H_2$ fuel is used for cooling the wall of the mixer, the fuel is then exhausted into the annular mixer passage from the outer wall of the mixer either radially or at angle. Although described with respect to $H_2$ fuel, other fuels may be provided.

The fuel tube assembly of the present disclosure may include fuel tube subassemblies that have separate fuel outlets (e.g., fuel injectors). Each fuel injector may have a separate cooling path to cool the wall in a particular sector of the mixer. Although shown with a circular cross-section, the cooling flow passages (e.g., fuel tubes) may have any cross-sectional shape. Although shown as extending longitudinally along (e.g., in the direction of the main flow through the annular mixer passageway) or circumferentially along (e.g., ninety degrees to the direction of the main flow through the annular mixer passageway), the fuel tubes may be placed at an angle with respect to the main flow direction.

The fuel tube assembly of the present disclosure may include a manifold to connect with the serpentine fuel channels. The manifold may be placed in the forward side or the aft side of the mixer.

The fuel tube assembly of the present disclosure may include multiple cooling channels, as described herein, with each injector and cooling circuit connected to a manifold. In some examples, the fuel tube assembly of the present disclosure may include a cluster of cooling tubes that may provide fuel flow to multiple injectors. In some examples, the fuel tube assembly of the present disclosure may include only one cooling tube with a varying diameter that cools the entire mixer and is connected to all fuel orifices. For example, the fuel tube assembly may have a diameter that is larger at inlet (e.g., at the manifold) with the cross section becoming smaller (i.e., reduced) as the fuel tube assembly reaches the injector location (e.g., the fuel outlet).

The fuel tube assembly of the present disclosure may include multiple serpentine cooling tubes on a center body (e.g., the bluff body) or on both the outer wall and the center body of the mixer.

The fuel tube assembly of the present disclosure may include an inner mixing tube surface on the outer wall of the mixer and the outer surface of the center body near the exit that may be coated with a passivating agent such as, for example, $SiO_2$, or other coating agent. The coating agent may prevent catalytic reaction of the hydrogen fuel. The boundary layer thickness near the exit of the mixing tube may be reduced by converging the flowpath and accelerating the flow. The pressure drop near the exit may be optimized with mixing tube air inlet pressure drop.

The fuel tube assembly of the present disclosure may include serpentine channels that may be additively made and optimized for boundary layer cooling performance as well as for producibility. Optimization of fuel pressure drop through the channels and the temperature drop in the boundary layer may be achieved for a range of engine operating conditions. The fuel tube assembly of the present disclosure may eliminate flashback and flame-holding risk without increasing combustor pressure drop that degrades engine performance. Flame-holding risk may increase with higher flame temperature during low power operation, but the cooling channels provided by the fuel tube assembly of the present disclosure may be effective at cooling the walls and, thus, may be more effective at higher fuel flow conditions to reduce flame-holding risk.

The fuel tube assembly of the present disclosure may provide internal, built-in, tube cooling channels to provide a means for safe operation of hydrogen burning combustors that may ensure premixer durability. The fuel tube assembly of the present disclosure may directly address the flashback/flame-holding risk of burning hydrogen fuels by actively cooling the boundary layer thereby quenching the flame if the flame propagates into the mixing tube, may create an array of compact flames stabilized by the aft-face of the premixer, and may create active boundary layer cooling. This may provide the advantage of designing a high performance premixer/combustor for emissions without compromising the design for addressing flashback/flame-holding risk.

Further aspects of the present disclosure are provided by the subject matter of the following clauses.

1. A fuel mixer configured to provide a fuel-air mixture to a combustor of an engine, the fuel mixer comprising: a mixer body having a mixer outer wall; center body; an annular passageway defined between the mixer outer wall and the center body; and a fuel tube assembly placed circumferentially about the mixer body, the fuel tube assembly comprising at least one fuel channel for injecting a fuel flow into the annular passageway, wherein the fuel tube assembly is configured to cool a boundary layer flow present in the annular passageway, wherein the fuel tube assembly is configured to cool the mixer outer wall, the center body, or both the mixer outer wall and the center body, and wherein heat from the mixer outer wall, the center body, or both the mixer outer wall and the center body, passes to the fuel flow in the fuel tube assembly.

2. A fuel mixer according to any of the preceding clauses, wherein the boundary layer flow is present near the mixer outer wall, near the center body, or near both the mixer outer wall and the center body.

3. A fuel mixer according to any of the preceding clauses, wherein the fuel tube assembly comprises a plurality of fuel tube subassemblies, each fuel tube subassembly having a fuel inlet and a fuel outlet.

4. A fuel mixer according to any of the preceding clauses, wherein the fuel inlet is downstream of the fuel outlet.

5. A fuel mixer according to any of the preceding clauses, wherein the fuel outlets are axially offset, circumferentially offset, or both axially offset and circumferentially offset, from one another.

6. A fuel mixer according to any of the preceding clauses, further comprising a fuel manifold coupled to the fuel tube assembly to supply fuel to the fuel tube assembly.

7. A fuel mixer according to any of the preceding clauses, wherein the fuel tube assembly is arranged helically around the mixer body.

8. A fuel mixer according to any of the preceding clauses, further comprising an additional fuel tube assembly arranged helically around the center body to cool a boundary layer flow on the center body.

9. A fuel mixer according to any of the preceding clauses, wherein a flow through the fuel tube assembly is a counter flow to a flow through the additional fuel tube assembly, and wherein the counter flow is either axially counter or radially counter.

10. A fuel mixer according to any of the preceding clauses, wherein the mixer outer wall, the center body, or both the mixer outer wall and the center body, is coated with a passivating agent.

11. A fuel mixer according to any of the preceding clauses, wherein the fuel tube assembly comprises: a fuel inlet; a fuel outlet; and a serpentine channel defined between the fuel inlet and the fuel outlet, wherein the fuel flow flows through the serpentine channel from the fuel inlet to the fuel outlet, and wherein, as the fuel flow flows through the serpentine channel, the fuel flow receives from the mixer outer wall, thus cooling the mixer outer wall.

12. A fuel mixer according to any of the preceding clauses, wherein the serpentine channel comprises a longitudinally ex-tending channel that extends along the length of the mixer body in the direction of flow.

13. A fuel mixer according to any of the preceding clauses, wherein the serpentine channel comprises a circumferentially extending channel that extends along the circumference of the mixer body.

14. A fuel mixer according to any of the preceding clauses, wherein the serpentine channel is angled with respect to a main flow through the mixer body.

15. A mixer array comprising one or more fuel mixers according to any of the preceding clauses.

16. A method of cooling a fuel mixer in a combustor, the method comprising: injecting an air flow into an annular passageway of the fuel mixer; injecting a fuel flow into the annular passageway downstream of the air flow; mixing the fuel flow and the air flow in the annular passage to provide a fuel-air flow; cooling the fuel-air flow with the fuel flow; cooling a mixer outer wall of the fuel mixer with the fuel flow; and cooling a center body of the fuel mixer with the fuel flow, wherein the fuel flow is provided within the outer mixer wall.

17. A method according to any of the preceding clauses, further comprising providing a serpentine channel within the outer mixer wall, wherein the fuel flow is provided within the serpentine channel, and wherein the fuel flow flows through the serpentine channels prior to being injected into the annular passageway.

18. A method according to any of the preceding clauses, wherein the fuel flow at an inlet of the serpentine channel is warmer than the fuel flow at an outlet of the serpentine channel due to the fuel flow gaining heat from the fuel mixer during cooling.

19. A method according to any of the preceding clauses, wherein cooling the fuel-air flow with the fuel flow comprises: providing a fuel tube assembly around the fuel mixer, the fuel tube assembly located downstream of the fuel mixer; and injecting the fuel flow through the fuel tube assembly prior to injecting of the fuel flow into the annular passageway, wherein the fuel flow in the fuel tube assembly cools the fuel-air flow before the fuel flow exits the fuel tube assembly into the annular passageway.

20. A method according to any of the preceding clauses, wherein the fuel tube assembly comprises a first helically extending channel around the fuel mixer and a second helically extending channel around a center body of the fuel mixer, the method further comprising causing a fuel to flow in the first helically extending channel and in the second helically extending channel.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

What is claimed is:

1. A fuel mixer configured to provide a fuel-air mixture to a combustor of an engine, the fuel mixer comprising:
   a mixer body having a mixer outer wall;
   a fuel inlet extending into the mixer outer wall, the fuel inlet feeding fuel to the fuel mixer;
   a center body;
   an annular passageway defined between the mixer outer wall and the center body, the annular passageway directing the fuel and air into the combustor of the engine as a flow of fuel-air mixture through the annular passageway and along the mixer outer wall, the mixer outer wall and the flow of the fuel-air mixture defining a fuel-air mixture boundary layer, the fuel-air mixture flowing through the annular passageway in a flow direction;
   a fuel outlet extending into the annular passageway, the fuel outlet feeding a flow of the fuel into the annular passageway;
   a first plurality of openings extending through the mixer outer wall for introducing the air into the annular passageway;
   a second plurality of openings extending through the mixer outer wall and axially spaced from the first plurality of openings, the second plurality of openings introducing the air into the annular passageway; and
   one or more fuel tube assemblies disposed circumferentially about the mixer body, each fuel tube assembly comprising at least one fuel channel for injecting the flow of the fuel from the fuel outlet into the annular passageway, the at least one fuel channel extending from the fuel inlet to the fuel outlet, the one or more fuel tube assemblies extending helically within the mixer body and directing the fuel flowing helically through the mixer body, and the one or more fuel tube assemblies being configured to cool the fuel-air mixture boundary layer present in the annular passageway and to cool the mixer outer wall, the center body, or both the mixer outer wall and the center body,
   wherein the fuel flowing helically flows through the mixer body in a direction that is opposite to the flow direction of the flow of the fuel-air mixture through the annular passageway, and wherein heat from the mixer outer wall, the center body, or both the mixer outer wall and the center body, transfers to the fuel flowing helically through the mixer body.

2. The fuel mixer of claim 1, wherein the flow of the fuel-air mixture boundary layer is present near the mixer outer wall, near the center body, or near both the mixer outer wall and the center body.

3. The fuel mixer of claim 2, further comprising an additional fuel tube assembly arranged helically around the center body to cool a boundary layer flow on the center body.

4. The fuel mixer of claim 3, wherein a first helical fuel flow through the one or more fuel tube assemblies is a counter flow to a second helical fuel flow through the additional fuel tube assembly, and wherein the counter flow is either axially counter or radially counter.

5. The fuel mixer of claim 1, further comprising a fuel manifold coupled to the one or more fuel tube assemblies to supply the fuel to the one or more fuel tube assemblies.

6. The fuel mixer of claim 5, wherein the fuel manifold is located downstream of the fuel outlet.

7. The fuel mixer of claim 1, wherein the mixer outer wall, the center body, or both the mixer outer wall and the center body, is coated with a passivating agent.

8. A mixer array comprising one or more fuel mixers according to claim 1.

9. A method of providing a fuel-air mixture to a combustor of an engine using a fuel mixer, the method comprising:
providing a mixer body having a mixer outer wall;
providing a fuel inlet extending into the mixer outer wall and feeding fuel to the fuel mixer through the fuel inlet;
providing a center body;
defining an annular passageway between the mixer outer wall and the center body, and directing the fuel and air through the annular passageway into the combustor as a flow of fuel-air mixture through the annular passageway and along the mixer outer wall, the mixer outer wall and the flow of the fuel-air mixture defining a fuel-air mixture boundary layer, the fuel-air mixture flowing through the annular passageway in a flow direction;
providing a fuel outlet extending into the annular passageway, and feeding a flow of the fuel into the annular passageway by the fuel outlet;
providing a first plurality of openings extending through the mixer outer wall to introduce the air into an annular passageway;
providing a second plurality of openings extending through the mixer outer wall and axially spaced from the first plurality of openings, and introducing the air into the annular passageway through the second plurality of openings;
disposing one or more fuel tube assemblies circumferentially about the mixer body, each fuel tube assembly comprising at least one fuel channel for injecting the flow of the fuel from the fuel outlet into the annular passageway, the at least one fuel channel extending from the fuel inlet to the fuel outlet, the one or more fuel tube assemblies extending helically within the mixer body and directing the fuel flowing helically through the mixer body, and the one or more fuel tube assemblies being configured to cool the fuel-air mixture boundary layer present in the annular passageway and to cool the mixer outer wall, the center body, or both the mixer outer wall and the center body;
wherein the fuel flowing helically flows through the mixer body in a direction that is opposite to the flow direction of the flow of the fuel-air mixture through the annular passageway, and
wherein heat from the mixer outer wall, the center body, or both the mixer outer wall and the center body, transfers to the fuel flowing helically through the mixer body.

10. The method of claim 9, further comprising:
injecting the fuel into the one or more fuel tube assemblies prior to injecting the helically flowing fuel into the annular passageway,
wherein the helically flowing fuel in the one or more fuel tube assemblies cools the fuel mixer before the helically flowing fuel exits the one or more fuel tube assemblies into the annular passageway.

11. The method of claim 10, further comprising disposing an additional fuel tube assembly circumferentially about the center body of the fuel mixer, the additional fuel tube assembly extending helically within the center body, and directing additional fuel to flow helically through the additional fuel tube assembly.

* * * * *